R. A. CHESEBROUGH.
Refining Coal-Oil.
No. 49,230. Patented Aug. 8, 1865.
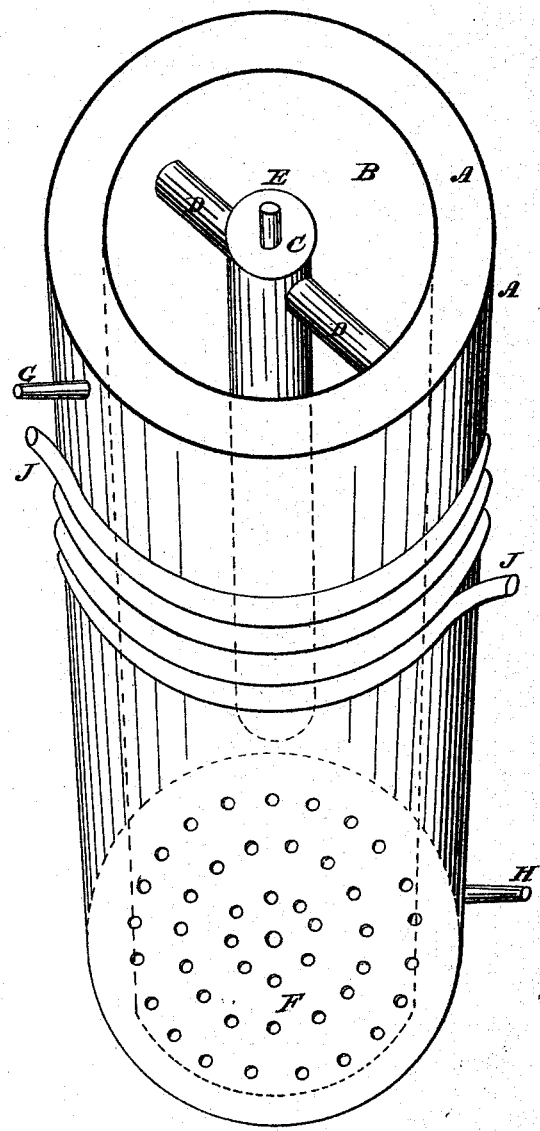
Witnesses:
Daniel Reigart
L. Leech
Inventor:
Robert A Chesebrough
By his Attorney
J Franklin Reigart

UNITED STATES PATENT OFFICE.

ROBERT A. CHESEBROUGH, OF NEW YORK, N. Y.

IMPROVEMENT IN APPARATUS FOR FILTERING PETROLEUM.

Specification forming part of Letters Patent No. 49,230, dated August 8, 1865.

*To all whom it may concern:*

Be it known that I, ROBERT A. CHESEBROUGH, of the city of New York and State of New York, have invented a new Mode of Filtering Petroleum and other Oils by the Application of Heat to the Filter; and I do hereby declare the following to be an exact description thereof, reference being had to the accompanying drawings, and to the letters of reference marked thereon, making a part of this specification.

The nature of my invention consists in the application of heat to a filter for hydrocarbon or other oils by means of three distinct cylinders or a steam-worm coiled inside or outside of the filter.

A represents the outside air-tight cylinder, to contain heated air or steam. B is a second and inner cylinder, that contains the filtering materials—bone-dust, &c.—and into which the oil is poured and filtered. In the center is another or third cylinder, C, shorter than the outer cylinder, B, and it is to contain heated air or steam, and is supported and connected by pipes D D, near the top, to the cylinder A, through which the hot air or steam passes from the outer cylinder, A, to the inner cylinder, C. The small pipe E at top is closed or tightly corked, and opened when necessary to pour off any water that may have collected in the cylinder C by the condensation of steam. The bottom F of the cylinder B is perforated for the filtered oil to flow through. The hot air or steam is injected through the side pipe, G, into the cylinder A; thence through the pipes D D, filling the center cylinder, C, and discharging at the lower pipe, H; or heating the whole by means of a worm, J, placed inside or outside of the filter, so that I do not endanger the filtering operation by the use of fuel or fire near to or underneath the outer cylinder, A, while my mode of applying the hot air or steam thins the oils so that they percolate and filter more freely and with rapidity through the filtering materials than they otherwise would when the same is cold, and the filtering is perfectly safe, complete, and economical.

What I claim as my invention, and desire to secure by Letters Patent, is—

The application of heat to a filter for hydrocarbon or other oils by means of a triple cylinder or a steam-worm coiled inside or outside of the filter, as herein set forth.

ROBT. A. CHESEBROUGH.

Witnesses:
J. FRANKLIN REIGART,
EDM. F. BROWN.